(12) United States Patent
Miyazaki et al.

(10) Patent No.: US 11,566,955 B2
(45) Date of Patent: Jan. 31, 2023

(54) DETECTION APPARATUS THAT IMPROVES A POSITIONAL RELATION BETWEEN A WORKING SURFACE AND A SENSOR

(71) Applicant: Sony Interactive Entertainment Inc., Tokyo (JP)

(72) Inventors: Yoshio Miyazaki, Kanagawa (JP); Kazuyuki Shikama, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 1 day.

(21) Appl. No.: 17/174,651

(22) Filed: Feb. 12, 2021

(65) Prior Publication Data

US 2021/0262878 A1 Aug. 26, 2021

(30) Foreign Application Priority Data

Feb. 21, 2020 (JP) .............................. JP2020-028361

(51) Int. Cl.
*G01L 5/16* (2020.01)
*B25J 13/08* (2006.01)
*G01L 5/00* (2006.01)

(52) U.S. Cl.
CPC ............... *G01L 5/16* (2013.01); *B25J 13/085* (2013.01); *G01L 5/0061* (2013.01)

(58) Field of Classification Search
CPC ....... G01L 5/16; G01L 5/0061; G01L 27/002; B25J 13/085
USPC .................................................... 73/862.041
See application file for complete search history.

(56) References Cited

U.S. PATENT DOCUMENTS

| 5,490,427 | A | 2/1996 | Arubaato |
| 6,915,709 | B2 | 7/2005 | Okada |
| 7,219,561 | B2 | 5/2007 | Okada |
| 9,623,568 | B1 * | 4/2017 | da Silva ................. B25J 13/085 |
| 9,778,132 | B1 * | 10/2017 | Urata ..................... B25J 13/085 |
| 2004/0187602 | A1 | 9/2004 | Okada |
| 2006/0169060 | A1 | 8/2006 | Okada |
| 2012/0165987 | A1 * | 6/2012 | Kim ...................... B62D 57/032 901/1 |
| 2013/0144437 | A1 * | 6/2013 | Lee ....................... B62D 57/032 700/258 |
| 2016/0109311 | A1 * | 4/2016 | Inazumi .................. G01L 5/226 73/862.042 |

FOREIGN PATENT DOCUMENTS

| JP | 08122178 A | 5/1996 |
| JP | 2004188532 A * | 7/2004 |

(Continued)

OTHER PUBLICATIONS

Notice of Reasons for Refusal for corresponding JP Application No. 2020-028631, 4 pages, dated Oct. 15, 2021.

*Primary Examiner* — Octavia Davis Hollington
(74) *Attorney, Agent, or Firm* — Matthew B. Dernier, Esq.

(57) ABSTRACT

There is provided a detection apparatus including a housing that includes a working surface, and a sensor configured to detect the force or the moment exerted on the working surface, on at least a first detection axis and a second detection axis. The working surface coincides with a surface that includes the first detection axis and the second detection axis, the working surface being at least partially symmetrical around the first detection axis passing through the center of the sensor.

6 Claims, 8 Drawing Sheets

(56) References Cited

FOREIGN PATENT DOCUMENTS

| | | | |
|---|---|---|---|
| JP | 2004325367 | A | 11/2004 |
| JP | 2004354049 | A | 12/2004 |
| JP | 4387691 | B2 | 12/2009 |

* cited by examiner

DETECTION APPARATUS THAT IMPROVES A POSITIONAL RELATION BETWEEN A WORKING SURFACE AND A SENSOR

CROSS REFERENCE TO RELATED APPLICATIONS

This application claims the benefit of Japanese Priority Patent Application JP 2020-028361 filed Feb. 21, 2020, the entire contents of which are incorporated herein by reference.

BACKGROUND

The present disclosure relates to a detection apparatus.

Force/torque sensors are known which detect the direction and magnitude of exerted force. The force/torque sensor detects, for example, the magnitude of the force in three axis directions (x, y, z) and the magnitude of torque around each of the axes. Examples of the force/torque sensor are described, for example, in Japanese Patent Laid-Open No. 2004-325367, Japanese Patent Laid-Open No. 2004-354049, and Japanese Patent Laid-Open No. Hei 8-122178.

SUMMARY

The force/torque sensor above detects the force and moment exerted on a surface such as a ground contact surface of a foot sole of a robot, for example. In detecting such a force and a moment, it is appropriate to correct the output of the sensor by taking into account the location where the sensor is installed in the robot and the effect of the environment in which the robot is placed. However, viable techniques for optimizing the positional relation between the working surface of the robot and the sensor on the assumption of these conditions have not been proposed yet.

Therefore, it is desirable to provide a detection apparatus that optimizes the positional relation between the working surface and the sensor.

According to an embodiment of the present disclosure, there is provided a detection apparatus including a housing that includes a working surface, and a sensor configured to detect the force or the moment exerted on the working surface, on at least a first detection axis and a second detection axis. The working surface coincides with a surface that includes the first detection axis and the second detection axis, the working surface being at least partially symmetrical around the first detection axis passing through the center of the sensor.

In the detection apparatus according to the embodiment, the working surface may be at least partially symmetrical further around the second detection axis passing through the center of the sensor.

In the detection apparatus according to the embodiment, the working surface as a whole may be symmetrical around each of the first detection axis and the second detection axis passing through the center of the sensor.

In the detection apparatus according to the embodiment, the working surface may have a missing portion formed symmetrically around the first detection axis passing through the center of the sensor.

In the detection apparatus according to the embodiment, the missing portion may be formed symmetrically further around the second detection axis passing through the center of the sensor.

In the detection apparatus according to the embodiment, the working surface may be a ground contact surface of a foot part of a robot.

The detection apparatus according to the embodiment may further include a correction processing section configured to correct the output of the sensor on the assumption that the force and the moment are generated evenly on both sides of the first detection axis in a part of the working surface that is symmetrical around the first detection axis.

The configurations outlined above make it possible to optimize the positional relation between the working surface and the sensor. Specifically, for example, the calculations for sensor output correction are simplified on the assumption that the force and the moment are evenly exerted on both sides of each detection axis.

DETAILED DESCRIPTION OF THE PREFERRED EMBODIMENT

One preferred embodiment of the present disclosure is described below in detail with reference to the accompanying drawings. Throughout the ensuing description and the drawings, the constituent elements having substantially identical functions and configurations are referred to by the same reference signs, and the redundant explanation is not repeated.

Figure 1:
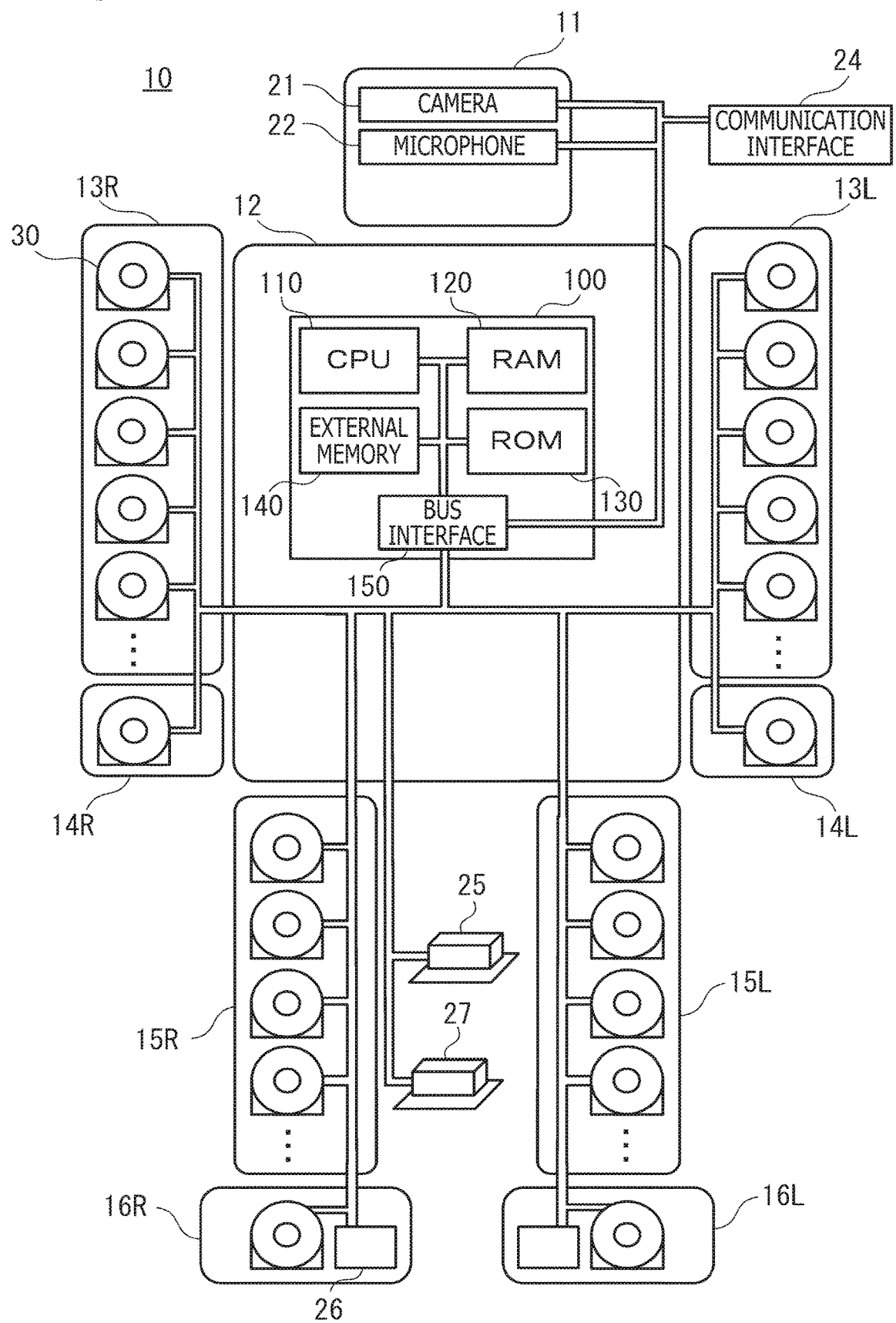
FIG. 1 is a view depicting a typical hardware configuration of a robot according to one embodiment of the present disclosure.

FIG. 1 is a view depicting a typical hardware configuration of a robot according to the embodiment of the present disclosure. As depicted in FIG. 1, a robot 10 has a control apparatus 100 installed in its main body part 12. The control apparatus 100 includes a central processing unit (CPU) 110, a random access memory (RAM) 120, a read-only memory (ROM) 130, and an external memory 140. The control apparatus 100 determines the operation of the robot 10 according to video data acquired by a camera 21, audio data obtained by a microphone 22, command signals received by a communication interface 24, or the like. The camera 21, microphone 22, and communication interface 24 are connected to the control apparatus 100 via a bus interface 150.

The control apparatus 100 controls the components of the robot 10 in a manner executing the determined operation. Specifically, the control apparatus 100 controls motors 30 that rotatively drive the joints of arm parts 13L and 13R, hand parts 14L and 14R, leg parts 15L and 15R, and foot parts 16L and 16R of the robot 10 so as to carry out the determined operation. Although not illustrated, a head part 11 and the main body part 12 may also have joints driven by the motors 30.

For example, the CPU 110 of the control apparatus 100 selects a pattern corresponding to the determined operation out of the control patterns stored in the ROM 130 or in the external memory 140, sets a foot part movement, a zero-moment point (ZMP) locus, a trunk movement, an upper limb movement, and the horizontal position and height of a lumbar part in keeping with the selected pattern, and controls the motors 30 according to the settings.

The robot 10 further incorporates sensors such as an inertial measurement unit (IMU) 25, a force/torque sensor 26, and a temperature sensor 27. The sensors are connected to the control apparatus 100 via the bus interface 150. The control apparatus 100 controls the components of the robot 10 by referencing the output values of the sensors as needed.

Figure 2:
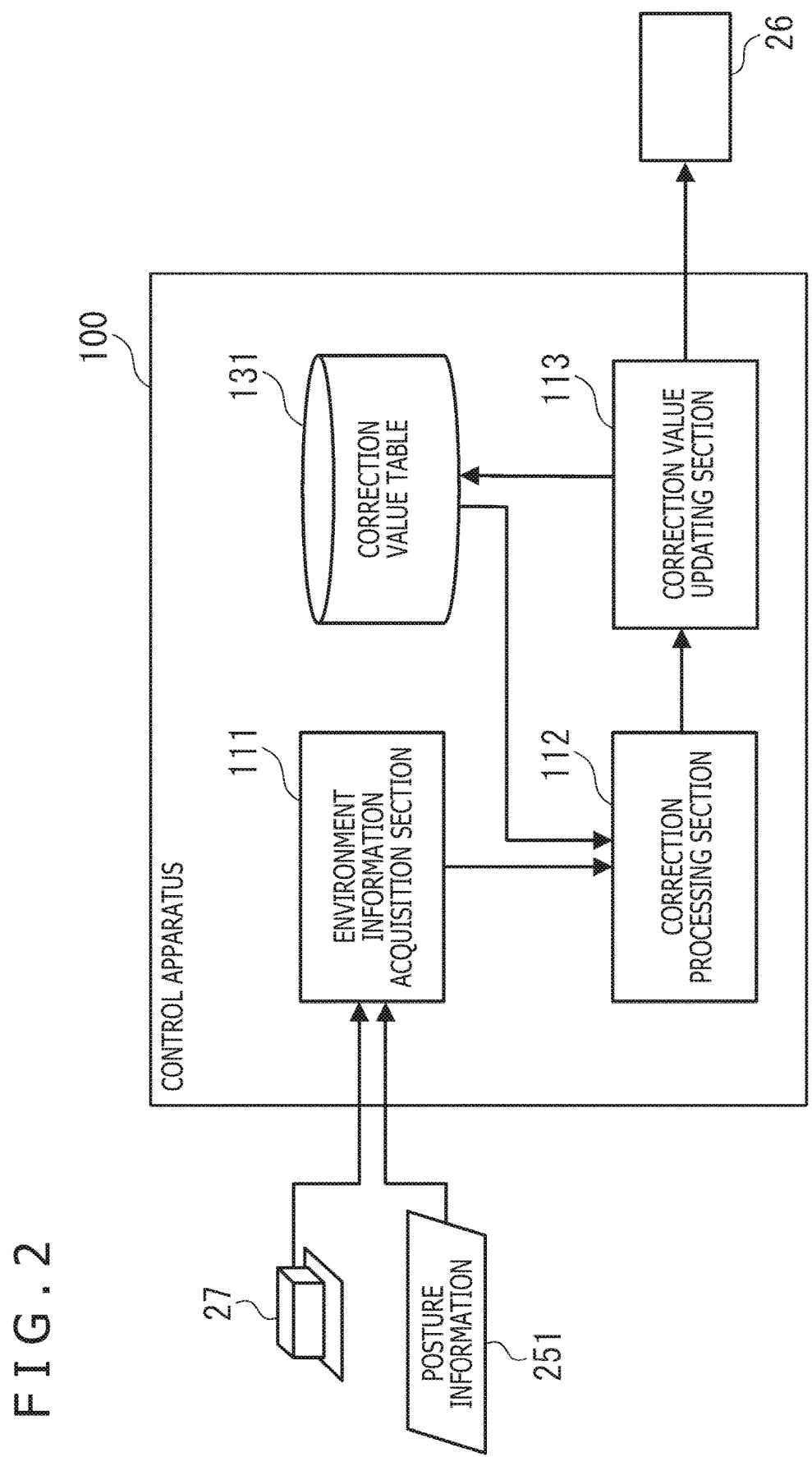
FIG. 2 is a block diagram depicting a functional block configuration related to the control of a force/torque sensor illustrated in FIG. 1.

FIG. 2 is a block diagram depicting a functional block configuration related to the control of the force/torque sensor illustrated in FIG. 1. As depicted in FIG. 2, the control apparatus 100 includes an environment information acquisition section 111, a correction processing section 112, and a correction value updating section 113 as functional blocks implemented by operating the CPU 110 (processor) according to programs stored in the ROM 130 or in the external memory 140. The ROM 130 or the external memory 140 stores a correction value table 131. The functions of the sections are described below in more detail.

The environment information acquisition section 111 acquires environment information indicative of an operating environment of the force/torque sensor 26. In the embodiment, the force/torque sensor 26 detects the force and the moment exerted on the housing surface of the robot 10, specifically, on a ground contact surface of each of the foot parts 16L and 16R attached to the leg parts 15L and 15R. The environment information includes information representing the operating environment of the force/torque sensor 26, such as an ambient temperature, the presence or absence of any object (including the floor surface and the land surface) in contact with the ground contact surface, and the material of the ground contact surface.

The correction processing section 112 corrects the output of the force/torque sensor 26 on the basis of the environment information acquired by the environment information acquisition section 111. The output correction may be performed, for example, as initialization of the force/torque sensor 26 or carried out continuously or periodically while the force/torque sensor 26 is in operation. In the embodiment with three axes, the force/torque sensor 26 detects the force (Fx, Fy, Fz) and moment (Mx, My, Mz) exerted on each axis. Alternatively, the correction processing section 112 may perform output correction differently on each of the axes.

In a case where the correction processing section 112 determines a correction value with respect to the output value of the force/torque sensor 26, the correction value updating section 113 updates the correction value in keeping with changes over time in the environment information, as will be discussed later. Specifically, for example, in a case where an ideal output value of the force/torque sensor 26 is already known by means of some other suitable method, the correction value updating section 113 updates the correction value corresponding to the operating environment indicated by the current environment information, on the basis of the difference between the actual output value of the force/torque sensor 26 and its ideal output value.

Figure 3:
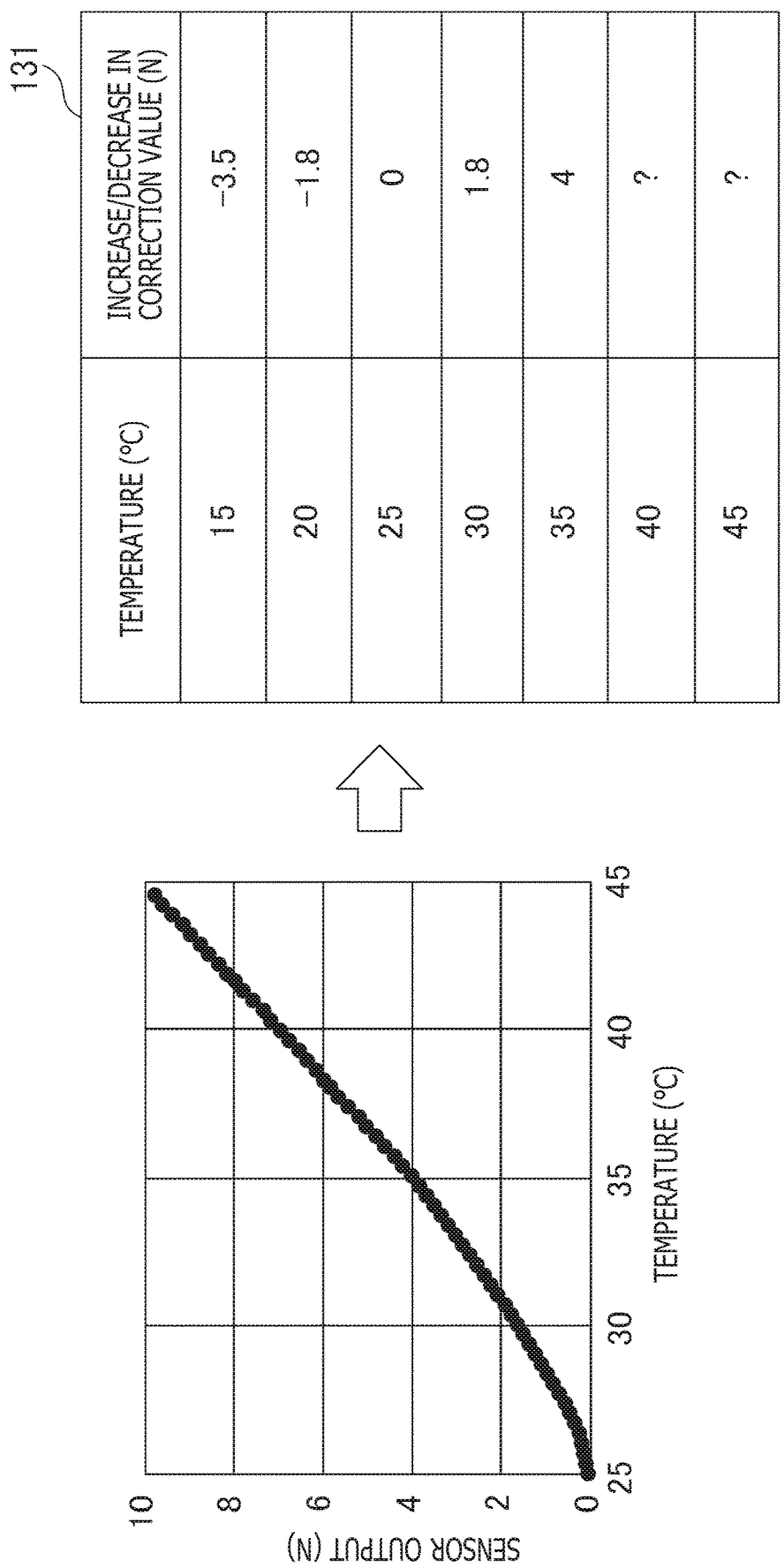
FIG. 3 is a set of views conceptually explaining an example of temperature-based output correction in the embodiment of the present disclosure.

FIG. 3 is a set of views conceptually explaining an example of temperature-based output correction in the embodiment of the present disclosure. The output value of the force/torque sensor 26 includes a bias output that is output regardless of the magnitude of the force or moment exerted on a detection surface. By contrast, the correction value may be initially set by performing calibration at a standard temperature (25° C. in the illustrated example), for example, in a manner canceling the bias output. However, as graphically illustrated in FIG. 3, the bias output is dependent on the temperature. Thus, when the temperature in the operating environment of the force/torque sensor 26 fluctuates, the bias output is not canceled by the correction value. The output value then incurs a drift due to an error in the bias output and to accumulated errors therein.

Given the foregoing, the correction processing section 112 in the embodiment determines the correction value with respect to the output value of the force/torque sensor 26 in keeping with its ambient temperature. In this case, the environment information acquired by the environment information acquisition section 111 includes temperature information indicative of the temperature measured by the temperature sensor 27. Since the temperature sensor 27 is mounted on the robot 10 along with the force/torque sensor 26, the temperature information may be regarded as information indicating the ambient temperature of the force/torque sensor 26. The correction value table 131 may store correction values set individually for different temperatures.

In the example depicted in FIG. 3, the correction values are set in such a manner that the output value of the force Fz is zero in no-load state at an ambient temperature of 25° C. If the same correction value is used at an ambient temperature of 30° C., an increased bias output puts the output value of the force Fz in no-load state not at zero but at 1.8 N. Thus, it is appropriate to make the correction value larger by 1.8 N at 30° C. than that at 25° C. Likewise, it is appropriate to make the correction value larger by 4 N at an ambient temperature of 35° C. than that at 25° C. Preferably, as in the correction value table 131 in the illustrated example, the correction values may be set discretely with respect to the temperature. In this case, the correction processing section 112 may interpolate the correction values (by linear interpolation in a simplified example) stored in the correction value table 131 so as to determine the correction value in a manner varying continuously with respect to the ambient temperature of the force/torque sensor 26.

In another example, the correction value may be set as a function of the temperature, with the correction value table 131 storing coefficients of the function. In this case, the correction processing section 112 inputs, to the function, the ambient temperature of the force/torque sensor 26 indicated by the temperature information, thereby determining a correction value that varies continuously with respect to the ambient temperature.

Figure 4:
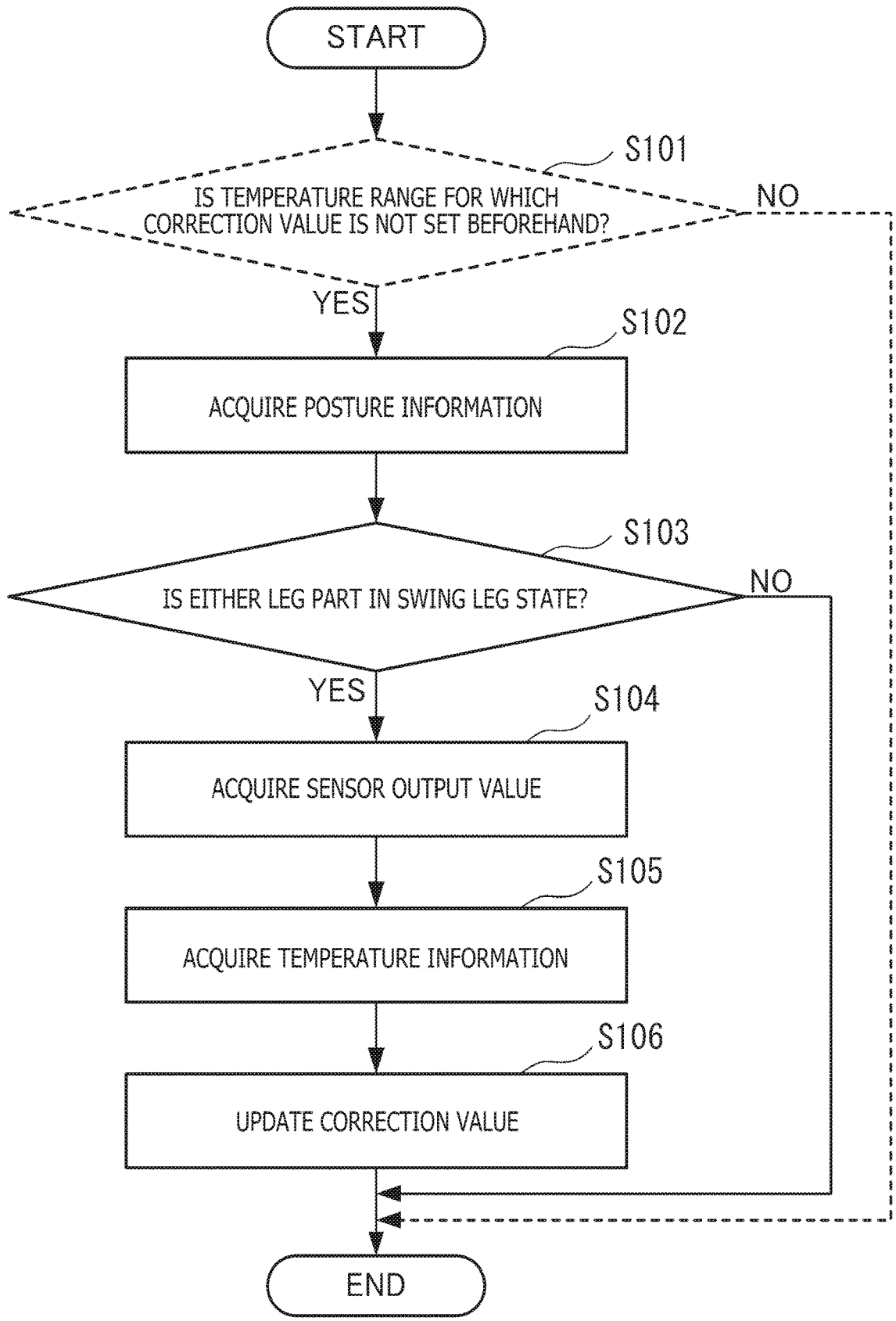
FIG. 4 is a flowchart depicting a typical process of updating the correction value in the example illustrated in FIG. 3.

FIG. 4 is a flowchart depicting a typical process of updating the correction value in the example illustrated in FIG. 3. The correction values with respect to the output values of the force/torque sensor 26 may be set beforehand by experiment and stored as fixed values in the correction value table 131, for example. In the illustrated example, the correction value updating section 113 updates the correction value with respect to changes over time in the environment information, specifically, with regard to changes over time in the ambient temperature of the force/torque sensor 26.

As described above, the force/torque sensor 26 in the embodiment detects the force and the moment exerted on the ground contact surface of the foot part 16L or 16R of the robot 10. It follows that, if there is no object (including the floor surface and the land surface) in contact with the ground contact surface, the force/torque sensor 26 is in no-load state. In this state, the output value of the force/torque sensor 26, specifically, the output value indicative of the force exerted perpendicularly to the ground contact surface (referred to as the force Fz hereunder), should ideally be zero.

Thus, the environment information acquisition section 111 acquires, as posture information 251 indicating the posture of the robot 10, information indicative of the robot operation determined by the control apparatus 100 as well as information representative of changes in the measured value of the IMU 25 generated as a result of the robot operation performed by control of the motors 30. From the posture information 251, it is possible to determine, for example, whether or not either of the leg parts 15L and 15R of the robot 10 is in a leg swing state, i.e., whether or not one of the leg parts is off the floor surface or land surface while the other leg part mainly supports the own weight of the robot 10. When one of the leg parts is in the leg swing state, there is presumably no object in contact with the ground contact surface of the foot part 16L or 16R coupled to the leg part in the leg swing state. Thus, the posture information 251 above may be used as contact information indicative of the presence or absence of any object in contact with the ground contact surface.

Given the above premises in the illustrated example, the environment information acquisition section 111 acquires the posture information 251 regarding the robot 10 (step S102). From the posture information 251, the correction value updating section 113 determines whether or not either of the leg parts 15L and 15R is in the leg swing state (step S103). Specifically, the correction value updating section 113 determines whether or not the robot 10 is in such a position that one of the leg parts 15L and 15R supports the own weight of the robot 10. In the case where one of the leg parts 15L and 15R is supporting the own weight of the robot 10, the other leg part is in the leg swing state.

In the case where one of the leg parts is in the leg swing state in the determination of step S103, the correction value updating section 113 updates the correction value of the force/torque sensor 26 attached to the ground contact surface of the foot part 16L or 16R coupled to the leg part in the leg swing state. Specifically, the correction value updating section 113 acquires the output value of the force Fz from the force/torque sensor 26 (step S104). The correction value updating section 113 also acquires temperature information indicative of the ambient temperature of the force/torque sensor 26 via the environment information acquisition section 111 (step S105). The correction value updating section 113 proceeds to update the correction value set in the correction value table 131 for the ambient temperature at this point in time in such a manner that the output value of the force Fz becomes zero (step S106).

The correction value update above makes it possible to set the appropriate correction value in keeping with the latest state of the force/torque sensor 26 in a case where an error is generated between the predetermined correction value on one hand and the actual bias output of the force/torque sensor 26 on the other hand, for example.

There may be temperatures for which no correction value is set beforehand as in the case of 40° C. or 45° C. in the correction value table 131 in the example in FIG. 3. In that case, the correction value updating section 113 may set, as in step S101 in FIG. 4, a new correction value in a case where the ambient temperature of the force/torque sensor 26 indicated by the temperature information reaches a temperature range for which no correction value is set beforehand. In this case, if the correction value at a standard temperature is initially set and if a temperature fluctuation subsequently occurs, the correction values for other temperature ranges are automatically set anew. Alternatively, the correction value may be set by the correction value updating procedure such as one depicted in FIG. 4 including correction value initialization. In this case, there is no need to initially set the correction value.

In another example where the correction values are set as a function of the temperature, the above-described correction value updating procedure may be used to update the coefficients of the function stored in the correction value table 131. In this case, the updating of the coefficients may fit the function that is initially set as a linear function with an average gradient into a curve indicative of the relation between the actual temperatures and the correction values.

Figure 5:
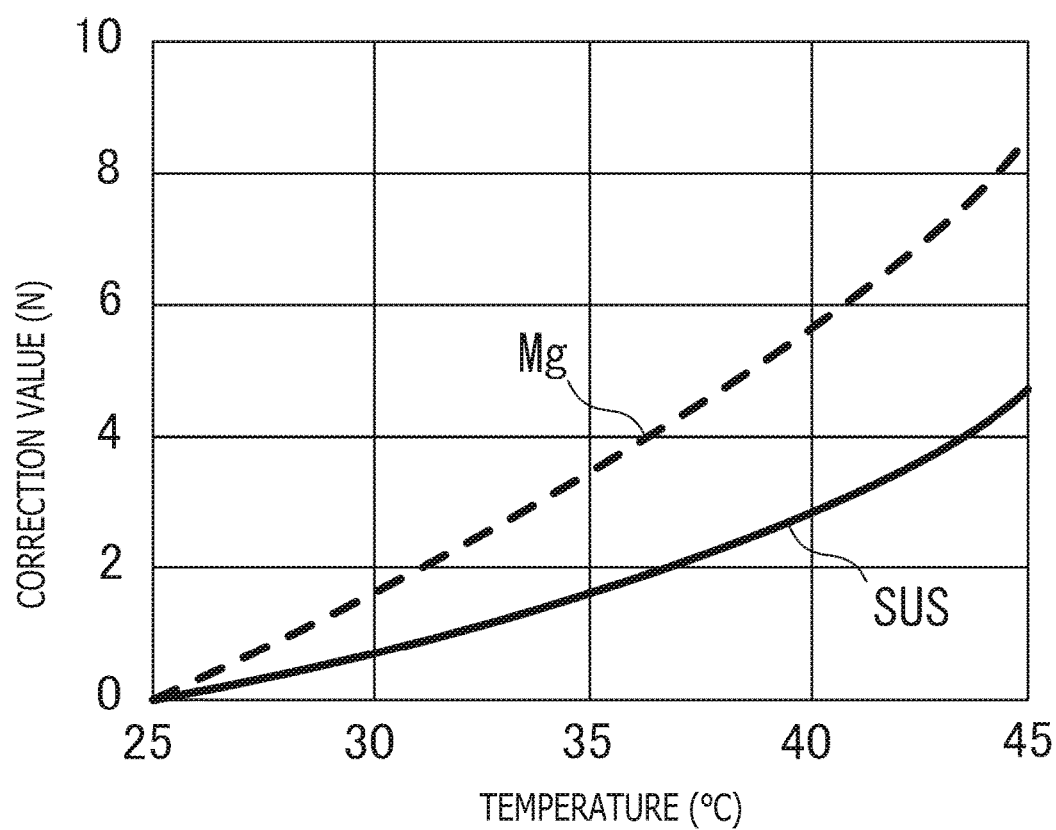
FIG. 5 is a view conceptually explaining an example of material-based output correction in the embodiment of the present disclosure.

FIG. 5 is a view conceptually explaining an example of material-based output correction in the embodiment of the present disclosure. The bias output included in the output value of the force/torque sensor 26 also varies depending on the material of a member interposed between the detection surface and the force/torque sensor 26. This is presumably attributable to physical coefficients such as a thermal expansion rate, hardness, and stiffness being different from one material to another. Thus, in the illustrated example, the environment information acquisition section 111 acquires material information indicative of the material of the member interposed between the detection surface and the force/torque sensor 26, i.e., the material information that indicates the material of the ground contact surface of the foot part 16L or 16R. In this case, the correction processing section 112 determines the correction value according to the thermal expansion rate of each material at the ambient temperature of the force/torque sensor 26 indicated by separately acquired temperature information. In the illustrated example, the correction processing section 112 determines the correction value that increases with respect to the temperature at a rate corresponding to each thermal expansion rate in two cases, that is, in one case where the material of the ground contact surface of the foot part 16L or 16R is a magnesium alloy (Mg) and in the other case where the material of the ground contact surface is a stainless alloy (SUS).

The configuration of the above-described embodiment of the present disclosure permits appropriate output correction of the force/torque sensor in keeping with its usage environment such as the temperature and the material of the detection surface. In the example above, it has been explained that the output of the force/torque sensor that detects both the force on the three axes (Fx, Fy, Fz) and the moment on the three axes (Mx, My, Mz) is corrected. Alternatively, the sensor may detect either the force or the moment. As another alternative, not three but two or one axis may be subject to detection by the sensor. Whereas the force/torque sensor explained in the example above detects the force and moment exerted on the ground contact surface of the foot part of the robot, the sensor may alternatively detect the force or moment exerted on some other part of the robot or on the housing surface of an apparatus other than the robot, the surface being in contact with an object.

Explained next are some arrangement examples of the force/torque sensor that may be adopted in the embodiment of the present disclosure. The sensor arrangement examples explained below may be used in a case where the output of the force/torque sensor is corrected according to the above-described embodiment, for example. Alternatively, the sensor arrangement examples may be used in a case where the sensor output is corrected in a manner different from the above embodiment. Although the examples that follow will explain how a ground contact surface 16S of the foot part 16L or 16R of the robot 10 in FIG. 1 acts as a working surface, the sensor may alternatively detect the force or moment exerted on some other part of the robot or on the working surface of the housing of an apparatus other than the robot.

Figure 6A:
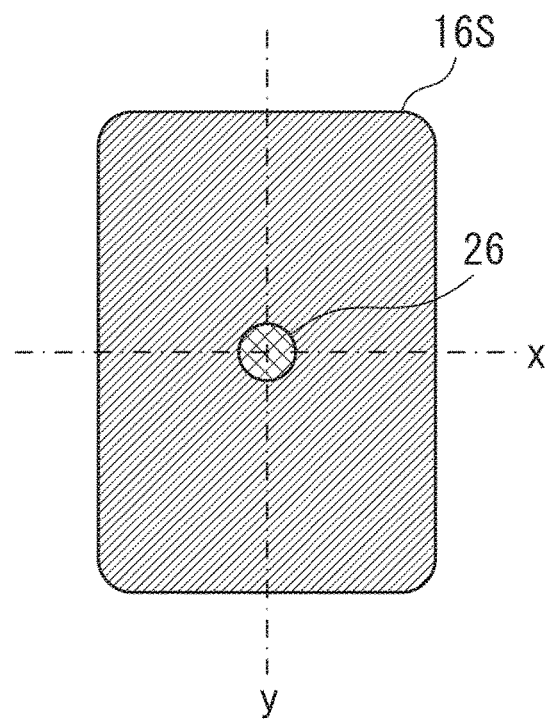
FIG. 6A is a view depicting a first arrangement example of the force/torque sensor.
Figure 6B:
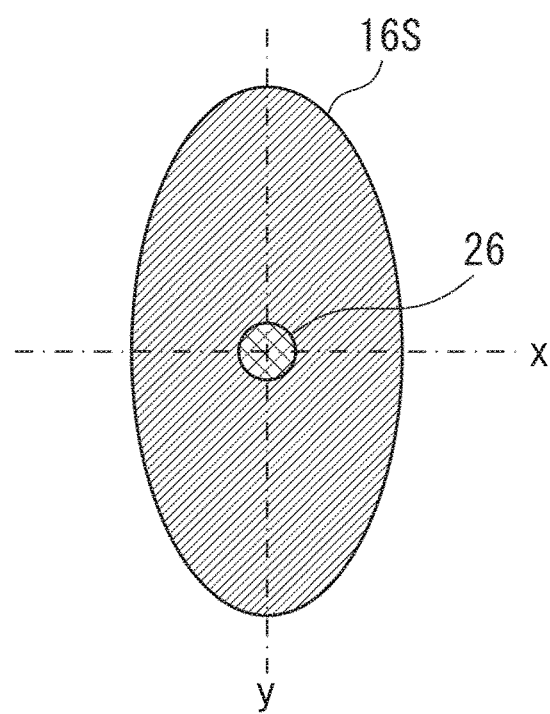
FIG. 6B is another view depicting the first arrangement example of the force/torque sensor.

FIGS. 6A and 6B are views depicting a first arrangement example of the force/torque sensor 26. In the illustrated example, the force/torque sensor 26 is arranged in such a manner that detection axes x and y coincide with the ground contact surface 16S and that the entire ground contact surface 16S is symmetrical around each of the detection axes x and y passing through the center of the force/torque sensor 26. Here, the detection axis x is an axis on which the force Fx and the moment Mx are detected, and the detection axis y is an axis on which the force Fy and the moment My are detected. The ground contact surface 16S is shaped to be symmetrical at a position with equal distances along the detection axes x and y in reference to the center of the force/torque sensor 26. The symmetrical shape allows the force and moment to be generated evenly on both sides of each detection axis. Thus, in the case where the correction processing section 112 of the control apparatus 100 above corrects the output of the force/torque sensor 26, for example, the calculations for correction can be simplified on the assumption that the force and the moment are evenly exerted on both sides of each detection axis.

Figure 7:
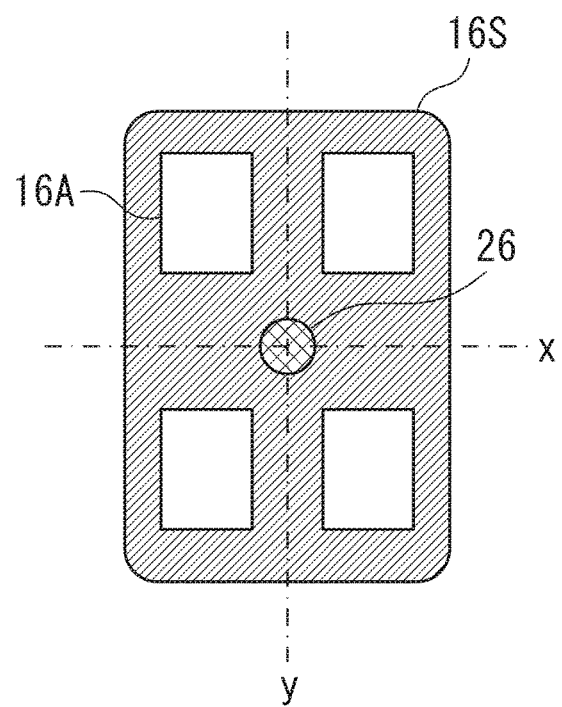
FIG. 7 is a view depicting a second arrangement example of the force/torque sensor.

FIG. 7 is a view depicting a second arrangement example of the force/torque sensor 26. In the illustrated example, as in the example in FIG. 6A, the outer shape of the ground contact surface 16S is rectangularly symmetrical around each of the detection axes x and y. Further, in the example in FIG. 7, the ground contact surface 16S has missing portions 16A that are symmetrical around each of the detection axes x and y. The missing portions 16A are cut-out portions formed for the purpose of saving weight, for example. When not only the outer shape of the ground contact surface 16S but also the structure such as the missing portions 16A is arranged to be symmetrical on both sides of each of the detection axes x and y, the transmission pathway for the force and the moment generated on both sides of each detection axis is made the same. As a result, the force and the moment are evenly generated on both sides of each detection axis. Thus, in the example in FIG. 7, as in the above-described examples in FIGS. 6A and 6B, it is possible to simply the calculations performed by the correction processing section 112 of the control apparatus 100 for correcting the output of the force/torque sensor 26.

Figure 8A:
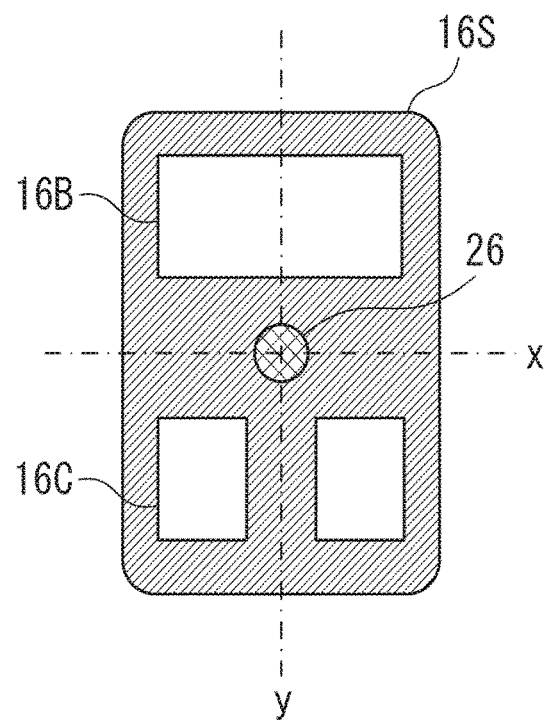
FIG. 8A is a view depicting a third arrangement example of the force/torque sensor.
Figure 8B:
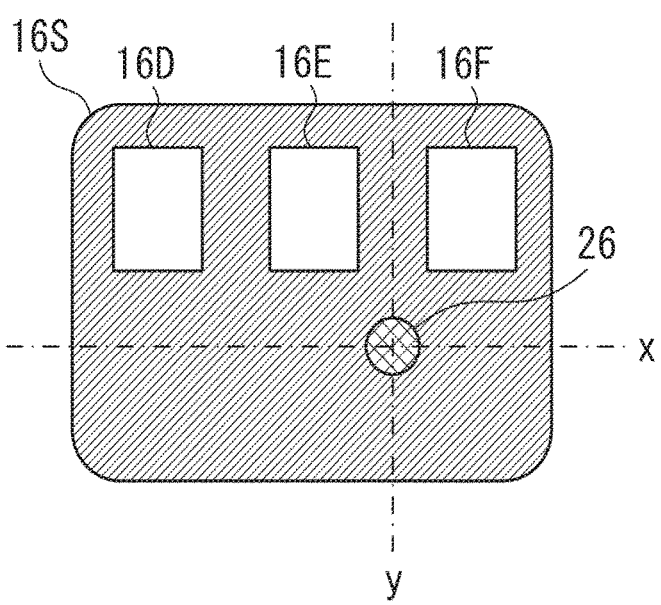
FIG. 8B is another view depicting the third arrangement example of the force/torque sensor.

FIGS. 8A and 8B are views depicting a third arrangement example of the force/torque sensor 26. In the example in FIG. 8A, the missing portions 16B and 16C formed on the ground contact surface 16S are shaped differently from each other. As a result, the entire ground contact surface 16S is symmetrical on both sides of the detection axis y but not on both sides of the detection axis x. Thus, although it can be assumed that the force and the moment are evenly generated on both sides of the detection axis y, the transmission pathways for the force and the moment on both sides of the detection axis x are not uniform. Therefore, it is appropriate to take measures such as changing correction coefficients on both sides of the detection axis x. In the example in FIG. 8B, on the other hand, the ground contact surface 16S as a whole is not symmetrical around each of the detection axes x and y passing through the center of the force/torque sensor 26. Still, of missing portions 16D, 16E, and 16F formed on the ground contact surface 16S, the missing portions 16E and 16F are arranged to be symmetrical around the detection axis y. Thus, a part of the ground contact surface 16S that includes the missing portions 16E and 16F may be assumed to have the force and the moment generated evenly.

It is therefore possible to assume that the force and the moment are evenly exerted on a part of the ground contact surface 16S not only in the case where the entire ground contact surface 16S is symmetrical around each of the detection axes x and y as in the above-described examples in FIGS. 6A, 6B, and 7, but also in the case where the ground contact surface 16S as a whole is symmetrical around either the detection axis x or the detection axis y as in the example in FIG. 8A as well as in the case where a part of the ground contact surface 16S has elements arranged symmetrically around one of the detection axes as in the example in FIG. 8B. It follows that, compared with the case where the ground contact surface 16S has no elements arranged symmetrically around any detection axis, for example, the calculations performed by the correction processing section 112 of the control apparatus 100 for correcting the output of the force/torque sensor 26 are simplified.

Whereas the preferred embodiment of the present disclosure has been described above in detail with reference to the accompanying drawings, the disclosure is not limited thereto. It is obvious that those skilled in the art will easily conceive various modifications or alterations of the disclosure within the scope of the technical idea stated in the appended claims. It is to be understood that such modifications and alterations also fall within the technical scope of the present disclosure.

What is claimed is:

1. A detection apparatus comprising:
   a housing that includes a working surface having at least a first missing portion and a second missing portion; and
   a sensor configured to detect a force or a moment exerted on the working surface, on at least a first detection axis and a second detection axis, wherein:
   the first detection axis and the second detection axis extend perpendicularly with respect to one another along the working surface,
   an intersection of the first detection axis and the second detection axis pass through a center of the sensor,
   the first and second missing portions are symmetrically disposed on opposite sides of at least one of the first detection axis and the second detection axis, and
   the working surface is at least partially symmetrical around at least one of the first detection axis and the second detection axis.

2. The detection apparatus according to claim 1, wherein the working surface is at least partially symmetrical around both the first detection axis and the second detection axis.

3. The detection apparatus according to claim 2, wherein the working surface as a whole is symmetrical around each of the first detection axis and the second detection axis.

4. The detection apparatus according to claim 1, wherein at least one of:

the working surface includes at least a third missing portion disposed on an opposite side of one of the first and second detection axes from the first and second missing portions, and the working surface includes at least a fourth missing portion symmetrically disposed on an opposite side of one of the first and second detection axes from the third missing portion.

5. The detection apparatus according to claim 1, wherein the working surface is a ground contact surface of a foot part of a robot.

6. The detection apparatus according to claim 1, further comprising: a correction processing section configured to correct an output of the sensor on an assumption that the force and the moment are generated evenly on both sides of the first detection axis in a part of the working surface that is symmetrical around the first detection axis.

* * * * *